(12) United States Patent
Cordray et al.

(10) Patent No.: US 8,342,478 B1
(45) Date of Patent: Jan. 1, 2013

(54) VALVE ACTUATOR ASSEMBLY AND METHODS OF USING THE SAME

(75) Inventors: Richard L. Cordray, Redmond, WA (US); Leslie A. Kremer, Union, WA (US); Jack Buss, Federal Way, WA (US)

(73) Assignee: Tri-Tec Manufacturing, LLC, Kent, WA (US)

( * ) Notice: Subject to any disclaimer, the term of this patent is extended or adjusted under 35 U.S.C. 154(b) by 635 days.

(21) Appl. No.: 12/485,809

(22) Filed: Jun. 16, 2009

Related U.S. Application Data

(60) Provisional application No. 61/061,971, filed on Jun. 16, 2008, provisional application No. 61/102,276, filed on Oct. 2, 2008.

(51) Int. Cl.
*F16K 31/02* (2006.01)

(52) U.S. Cl. ............... 251/129.03; 251/129.04; 137/554; 73/168

(58) Field of Classification Search ............. 251/129.03, 251/129.12, 129.04; 137/637, 554; 73/168
See application file for complete search history.

(56) References Cited

U.S. PATENT DOCUMENTS

| | | | | |
|---|---|---|---|---|
| 2,005,891 A * | 6/1935 | Elberty, Jr. | ............... | 251/129.03 |
| 2,815,922 A * | 12/1957 | Thomas et al. | ........... | 251/129.03 |
| 3,170,339 A * | 2/1965 | Plume | ....................... | 251/129.12 |
| 4,361,308 A * | 11/1982 | Buss | ........................ | 251/129.12 |
| 4,570,903 A * | 2/1986 | Crass | ....................... | 251/129.12 |
| 4,805,451 A * | 2/1989 | Leon | ............................... | 73/168 |
| 4,879,901 A * | 11/1989 | Leon | ............................... | 73/168 |
| 4,882,937 A * | 11/1989 | Leon | ............................... | 73/168 |
| 5,009,101 A * | 4/1991 | Branam et al. | .................. | 73/168 |
| 5,029,597 A * | 7/1991 | Leon | ............................... | 73/168 |
| 5,111,690 A * | 5/1992 | Duff | ............................... | 73/168 |
| 5,140,853 A * | 8/1992 | Branam et al. | .................. | 73/168 |
| 5,142,906 A * | 9/1992 | Smith | ............................ | 73/168 |
| 5,167,151 A * | 12/1992 | Hinant et al. | .................. | 73/168 |
| 5,197,338 A * | 3/1993 | Heiman et al. | .................. | 73/168 |
| 5,220,843 A * | 6/1993 | Rak | ................................ | 73/168 |
| 5,329,465 A * | 7/1994 | Arcella et al. | ................ | 137/554 |
| 5,396,167 A * | 3/1995 | Leon | ............................... | 73/168 |
| 5,430,368 A * | 7/1995 | Leon | ............................... | 73/168 |
| 5,432,436 A * | 7/1995 | Leon et al. | ...................... | 73/168 |
| 5,433,245 A * | 7/1995 | Prather et al. | ............ | 251/129.12 |
| 5,435,177 A * | 7/1995 | Roberts | ........................... | 73/168 |
| 5,454,273 A * | 10/1995 | Smith | ............................ | 73/168 |
| 5,487,302 A * | 1/1996 | Casada et al. | .................. | 73/168 |
| 5,548,997 A * | 8/1996 | Bauer | ............................ | 73/168 |
| 5,579,659 A * | 12/1996 | Roberts | ........................... | 73/168 |
| 5,671,635 A * | 9/1997 | Nadeau et al. | .................. | 73/168 |
| RE35,918 E * | 10/1998 | Anderson et al. | .......... | 73/862.49 |
| 5,836,567 A * | 11/1998 | Watanabe | ............... | 251/129.12 |
| 6,003,837 A * | 12/1999 | Raymond et al. | ........ | 251/129.12 |
| 7,584,668 B2 * | 9/2009 | Ohta et al. | ...................... | 73/168 |

* cited by examiner

*Primary Examiner* — Eric Keasel
(74) *Attorney, Agent, or Firm* — Seed IP Law Group PLLC

(57) ABSTRACT

Valve systems include a valve and a valve actuator assembly for operating the valve. The valve actuator assembly includes a controller that uses stored information and signals from a sensor to open and close the valve. The controller can manipulate, analyze, evaluate, store, and communicate information related to the history of the valve, performance of the valve, valve settings, and the like. The controller can send information to a replacement controller or a replacement valve actuator assembly. Various types of wired and wireless connections can establish communication between the controller and the replacement controller or replacement valve actuator assembly.

10 Claims, 17 Drawing Sheets

VALVE ACTUATOR ASSEMBLY AND METHODS OF USING THE SAME

CROSS-REFERENCES TO RELATED APPLICATIONS

This application claims the benefit under 35 U.S.C. §119 (e) of U.S. Provisional Patent Application No. 61/061,971 filed Jun. 16, 2008; and U.S. Provisional Patent Application No. 61/102,276 filed Oct. 2, 2008. These provisional applications are incorporated herein by reference in their entireties.

BACKGROUND

1. Technical Field

The present disclosure generally relates to valve actuator assemblies, more particularly, to valve actuator assemblies for use in a marine environment and methods of using the same.

2. Description of the Related Art

Valve actuators are often used to open and close valves positioned along pipes. Electric valve actuators can be used in a wide range of settings, including in waste water treatment plants, refineries, power plants, factories, and transportation vehicles, such as watercraft. Based on the ambient environment, components of electric valve actuators can be corrosion resistant, temperature resistant, explosion resistant, and/or resistant to other environmental conditions.

Electric valve actuators often include an electric motor and a rotatable hand wheel assembly that can operate independently of the electric motor. When the motor is energized, the valve actuator can automatically operate the valve. The hand wheel assembly may be inactive (i.e., the hand wheel assembly disengages a gear train for operating the valve) when the motor is energized. During a power failure or motor malfunction, an individual can rotate the hand wheel assembly to operate the valve. Thus, conventional electric valve actuators can manually or automatically operate the valve.

During operating, an electric valve actuator can limit or stop movement of a valve member (e.g., a gate) when the valve member reaches the end of travel position. At the end of travel of the valve member (e.g., when the valve is at or near the fully open or fully closed position), the force required to move the valve member may be relatively high. Torques required to move the valve members may therefore vary with respect to the position of the valve member. The valve actuators can have controllers that control actuation of the valve members. Because torque settings are not communicated between controllers, it is difficult to replace a controller and ensure proper functioning of the valve actuator without performing a calibration procedure involving applying a known calibrated load to the valve actuator. Unfortunately, conventional calibration procedures employ bulky, heavy calibration equipment that is often unsuitable for use in the field.

Valve actuators may have mechanical components used to determine the state of the valve (e.g., whether the valve is fully open, partially open, or fully closed). It may be difficult to calibrate these valve actuators because the mechanical components (e.g., components of mechanical sensors) may have to be replaced to adjust end of travel positions of the valve member, feedback, and the like. For example, helical springs of a mechanical sensor inside of a housing of conventional valve actuators may have to be replaced, thus requiring disassembling of the housing. When the housing is disassembled, unwanted contaminates (e.g., dirt or water) may enter the housing and cause impaired actuator performance, damage to the valve actuator, and the like.

BRIEF SUMMARY

Some embodiments disclosed herein include a valve system that includes a valve and a valve actuator assembly that uses information associated with operation of the valve. The valve actuator assembly can manipulate, analyze, evaluate, store, or communicate (e.g., transmit, receive, and the like) information related to the valve, for example, the history of the valve movement, specifications of the valve, performance of the valve, or valve settings (e.g., torque settings, position settings, and the like).

In some embodiments, a valve actuator assembly includes a main body, a drive device (e.g., an electric motor), and a hand wheel assembly for causing movement of a valve connected to the valve actuator assembly. The main body houses a sensor capable of detecting the amount of force applied to the valve and sending at least one signal indicative of the detected force. The valve actuator assembly also includes a controller in communication with the drive device and the sensor. In some embodiments, the valve actuator assembly is not physically coupled the valve. For example, another component for transmitting forces can couple the valve actuator assembly to the valve.

The controller includes a storage element adapted to store information based, at least in part, on signals sent by the sensor. If the controller is replaced with another controller, the information can be transferred to the replacement controller. The replacement controller can operate the valve without performing a traditional calibration process, which is a time consuming process that requires applying a set of known torques to an output assembly of valve actuator assembly. The controller can be programmed based on, but not limited to, the configuration of a drive assembly of the valve actuator assembly, torques for actuating valve members, end of travel positions for valve members, and the like. Thus, position settings, force settings, travel limits, and the like can be manually or automatically inputted into the controller.

In some embodiments, a valve actuator assembly for operating a valve includes a sensor operable to detect and to generate at least one signal indicative of a force applied to a valve coupled to the valve actuator assembly. The valve actuator assembly can include a storage element adapted to store information indicative of the at least one signal generated by the sensor. A controller is communicatively coupled to a drive device (e.g., an electric motor) and the storage element. The controller is operable to control the drive device based, at least in part, on the information stored by the storage element.

In some embodiments, a marine valve actuator assembly includes a main body, an energizable motor, a hand wheel assembly coupled to the main body, a sensor, a storage element, and a controller. The main body includes a drive assembly and a movable output assembly. The energizable motor is adapted to cause movement of the output assembly relative to the main body to open and close a valve. The hand wheel assembly is adapted to cause movement of the output assembly relative to the main body to open and close the valve. The sensor is operable to detect and to generate at least one signal indicative of a force applied to the valve by the valve actuator assembly. The storage element is adapted to store information indicative of the at least one signal generated by the sensor. The controller is communicatively coupled to the motor and the storage element and is operable to control the motor based, at least in part, on the information stored by the storage element.

The valve actuator assembly can further include a receiving slot configured to receive and releasably hold the storage element. The receiving slot can be positioned along the controller or the main body of the valve actuator assembly. A user can conveniently access the storage element by manually removing the storage element from the receiving slot.

The valve actuator assembly can further include a first communication device configured to send the information stored by the storage element to a second communication device of another marine valve actuator assembly. In some embodiments, the first communication device is adapted to wirelessly transmit the information. In other embodiments, the first communication device is adapted to transmit the information via a wired connection. In some embodiments, the first communication device transmits the information while the valve actuator assembly is coupled to the valve positioned along a fluid line of a watercraft.

In some embodiments, a method of using a first controller of a first motorized valve actuator assembly and a second controller is provided. The method comprises sending information from the first controller to the second controller. The information corresponds to one or more signals generated by a sensor of the first motorized valve actuator assembly during operation of a valve coupled to the first motorized valve actuator assembly. The information is stored on a storage element associated with the second controller. In some embodiments, the first controller of the first motorized valve actuator assembly is replaced with a second controller. The second controller can then operate the first motorized valve actuator assembly using information stored on the storage element.

In some embodiments, a method of using a first valve actuator assembly and a second valve actuator assembly is provided. The method includes sending information from the first valve actuator assembly to the second valve actuator assembly. The information corresponds to one or more signals from a sensor of the first valve actuator assembly associated with operation of a valve coupled to the first valve actuator assembly. At least a portion of the information is stored on a storage element associated with a second valve actuator assembly.

The first valve actuator assembly can be replaced with a second valve actuator assembly. In some embodiments, the first valve actuator assembly is separated from the valve. The second valve actuator assembly can then be coupled to the valve. The second valve actuator assembly can operate the valve using information stored on the storage element. In some embodiments, the storage element is communicatively coupled to a controller of the second valve actuator assembly.

In some embodiments, a method of manufacturing a valve actuator assembly is provided. The method comprises inputting opening valve data to a controller of the valve actuator assembly. The opening valve data is associated with an opening valve signal generated by a sensor of the valve actuator assembly when the valve actuator assembly applies a nominal opening force for opening a valve. Open valve data is inputted to the controller. The open valve data is associated with an open valve signal generated by the sensor when the valve actuator assembly applies an open force to the valve when the valve is at least proximate to a fully open position. Closing valve data can be inputted into the controller. The closing valve data is associated with a closing valve signal generated by the sensor when the valve actuator assembly applies a closing force for closing the valve. Closed valve data can be inputted into the controller. The closed valve data is associated with a closed valve signal generated by the sensor when the valve actuator assembly applies a closed force to close the valve from the valve is at least proximate to a closed position. For example, the valve is at least proximate to a closed position when a valve member of the valve seats against a sealing member of the valve to form a fluid tight seal. Thus, the closed force can be greater than the closing force. The data can be generated by performing a calibration procedure, provided by a manufacture of the valve, and the like.

At least one of the opening valve data, the open valve data, the closing valve data, and the closed valve data is inputted without applying a calibrated external force to a movable output assembly of the valve actuator assembly. The movable output assembly can be adapted for coupling to and for actuating a valve member of the valve. In some embodiments, a sensor can be mechanically manipulated such that a display of the valve actuator assembly displays an output associated with the inputted data. For example, the display can output a digital number (e.g., counts) associated with a digital output of the sensor. The mechanical manipulation of a sensor can comprise manually displacing a bracket to which one or more strain gauges are attached. In some embodiments, an external device, such as an electronic simulator, is used to input data. The electronic simulator can be adapted to generate at least one signal associated with the inputted data. The inputting of data can also be performed while the valve is connected to the valve actuator assembly.

In some embodiments, a method of manufacturing a valve actuator assembly for use with a valve is provided. The method comprises inputting a plurality of reference values to a valve actuator assembly independent of a load, if any, applied to an output assembly of the valve actuator assembly. The plurality of reference values is stored such that a valve connected to the output assembly is opened and closed based, at least in part, on at least one of the reference values stored by the valve actuator assembly and at least one signal from a sensor of the valve actuator assembly. A plurality of sets of reference values may be provided in order to program the valve actuator assembly. Each set of reference values can correspond to a different valve. A user can select a set of reference values based on the specifications of the valve and program the valve actuator assembly using that set of reference values. The reference values can be generated using a calibration procedure.

An initial reference value can be inputted into the valve actuator assembly when the output assembly is unloaded. The initial reference value can correspond to zeroing of a sensing component (e.g., a strain gauge) of the sensor. In some embodiments, the plurality of reference values corresponds to a plurality of signals from the sensor when the output assembly actuates a valve member of the valve.

At least one signal from the sensor can be compared to the plurality of reference values stored by the valve actuator assembly. Movement of the valve can be controlled based on the comparison of the at least one signal from the sensor in the stored reference values. A controller of the valve actuator assembly can perform various comparisons using signals from the sensor and the stored reference values.

The valve actuator assembly can move the valve between an open position and a closed position using a variable force based, at least in part, on the at least one signal from the sensor associated with at least one of the reference values stored by the valve actuator assembly. The variable force can account for variable torques required to move a valve member of the valve.

The method can further include using a relationship based on the plurality of reference values. In some embodiments, the method includes producing a sensor signal-valve position relationship based on the plurality of reference values. Other types of relationships are also possible. In some embodiments, the valve actuator assembly includes a motor, a drive system connecting the motor to the output assembly, a controller that controls the motor, and a sensor communicatively coupled to the controller. The controller can control the force applied to the valve based on the sensor signal-valve position relationship.

In some embodiments, a valve actuator assembly is automatically calibrated using a calibration test stand and an external component, such as a computer. The valve actuator assembly is mounted on the calibration test stand and is in communication with the external component. The external component controls operation of the valve actuator assembly and the calibration test stand. The external component causes the valve actuator assembly to move between different positions, and the calibration test stand applies load(s) to the valve actuator assembly. A sensor of the valve actuator assembly is used to measure and record the applied load during opening, closing, or at certain positions. The measurements are recorded in a controller of the valve actuator assembly, the external component, or both.

In some embodiments, a method of calibrating a valve actuator assembly is provided. An output of the valve actuator assembly is coupled to a calibration test stand. The output of the valve actuator assembly is adapted to couple to a valve. The valve actuator assembly and the calibration test stand are communicatively coupled to another device, such as a controller in the form of a computer. The computer is capable of commanding the valve actuator assembly and/or the calibration test stand. A force is applied to the valve actuator assembly using the calibration test stand. The force is detected using a sensor of the valve actuator assembly. In some embodiments, the force detected by the sensor is compared to a force signal from the calibration test stand.

When the valve actuator assembly is installed, the output of the valve actuator assembly is movable between an open position corresponding to a valve in an open state and a closed position corresponding to the valve in a closed state. The valve actuator assembly operates the valve based, at least in part, on the comparison of the force detected by the sensor and the force signal from the calibration test stand. The comparison can be used to generate reference data that is used to program the valve actuator assembly. The valve actuator assembly uses the data to properly operate the valve.

A calibration system includes a calibration test stand, a valve actuator assembly, and a control device. The valve actuator assembly has a sensor and an output assembly adapted to couple to a valve. The output assembly is coupled to the calibration test stand such that the calibration test stand can apply a load to the valve actuator assembly that is measured by the sensor. The control device is in communication with the calibration test stand and in communication with the valve actuator assembly. The control device is configured to command the calibration test stand and control movement of the output assembly.

The calibration test stand is configured to apply a force to the valve actuator assembly based on a signal from the control device. The sensor is configured to detect the force applied by the calibration test stand. Output from the sensor is correlated with the force (e.g., torques) applied by the calibration test stand. The sensor, for example, can output counts that are correlated with torques associated with operating the valve.

The control device is adapted to evaluate the output from the sensor and the operation of the calibration test stand. The control device, in some embodiments, compares the force detected by the sensor and a force signal from the calibration test stand. A controller of the valve actuator assembly can be programmed by the control device or using output from the control device generated based on the comparison.

BRIEF DESCRIPTION OF THE SEVERAL VIEWS OF THE DRAWINGS

Non-limiting and non-exhaustive embodiments are described with reference to the following drawings, wherein like reference numerals refer to like parts or acts throughout the various views unless otherwise specified. The sizes and relative positions of elements in the drawings are not necessarily drawn to scale.

DETAILED DESCRIPTION

Figure 1:
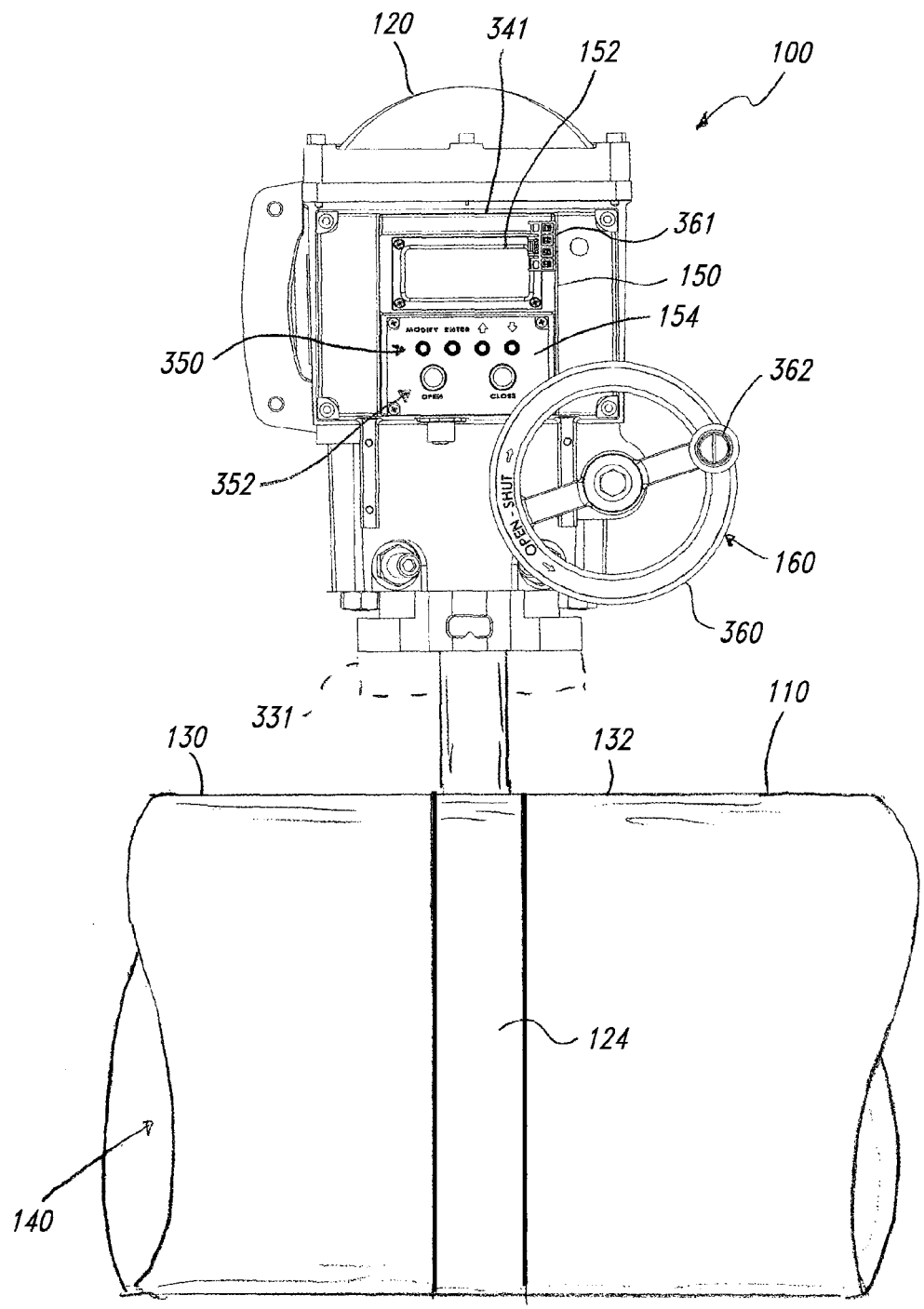
FIG. 1 is a pictorial view of a valve system installed along a conduit, in accordance with one embodiment.

FIG. 1 shows a valve system 100 positioned along a conduit 110. The valve system 100 includes a valve actuator assembly 120 coupled to a valve 124 positioned between two sections 130, 132 of the conduit 110. The valve actuator assembly 120 operates the valve 124, which in turn regulates the flow of substances through the conduit 110. For example, the valve actuator assembly 120 opens the valve 124 to allow fluid flow along a passageway 140 of the conduit 110. To halt the fluid flow, the valve actuator assembly 120 closes the valve 124.

The valve actuator assembly 120 includes an electric controller 150 for automatically controlling the operation of the valve 124. The controller 150 includes a display 152 for displaying information to a user and manual input device 154 for inputting data. In one embodiment, the valve actuator assembly 120 further includes a hand wheel assembly 160 for operating the valve 124 without employing the controller 150. In this embodiment, the hand wheel assembly 160 operates the valve 124 during an electrical power outage. A hand wheel 360 of the hand wheel assembly 160 can be rotated clockwise to shut the valve 124 and rotated counterclockwise to open the valve 124. An elongate handle 362 (see FIG. 6) provides for convenient gripping by the user.

The valve system 100 is suitable for use in a range of different environments, including, without limitation, non-corrosive environments, corrosive environments, magnetic environments, non-magnetic environments, moist environments, marine environments, or combinations thereof. Marine environments are especially harsh because of the abundance of moisture and corrosive substances, such as salt water. The compact and robust valve system 100 is especially well suited for use in ocean liners, ships, including military ships and submarines with limited mounting space for a valve system. In some embodiments, the valve system 100 may be used in civilian or military watercraft (e.g., floating vessels, boats, ships, submergible vehicles such as submarines, and the like). The illustrated marine valve system 100 can be submerged for an extended length of time without appreciably compromising performance, damaging internal components, and the like. Various components of the valve system 100 can be modified or removed based on the surrounding environment, if needed or desired.

The controller 150 will generally include, without limitation, one or more central processing units, processing devices, microprocessors, digital signal processors (DSP), application-specific integrated circuits (ASIC), readers, and the like. To store information, controllers also include one or more storage elements, such as volatile memory, non-volatile memory, read-only memory (ROM), random access memory (RAM), and the like. The storage elements can be coupled to the controllers by one or more busses. Example displays include, but are not limited to, LCD screens, monitors, analog displays, digital displays (e.g., light emitting diode displays), or other devices suitable for displaying information.

The term "information" includes, without limitation, one or more programs, executable code or instructions, routines, relationships (e.g., torque versus displacement curves, sensor signals versus valve positions, etc.), data, operating instructions, combinations thereof, and the like. For example, information may include one or more torque settings (or other force settings) suitable for opening and closing the valve. In some embodiments, information can be transmitted between valve actuator assemblies, between an installed controller and a replacement controller, between a controller and a computer, across a network, and the like, as explained in more detail herein.

Figure 6:
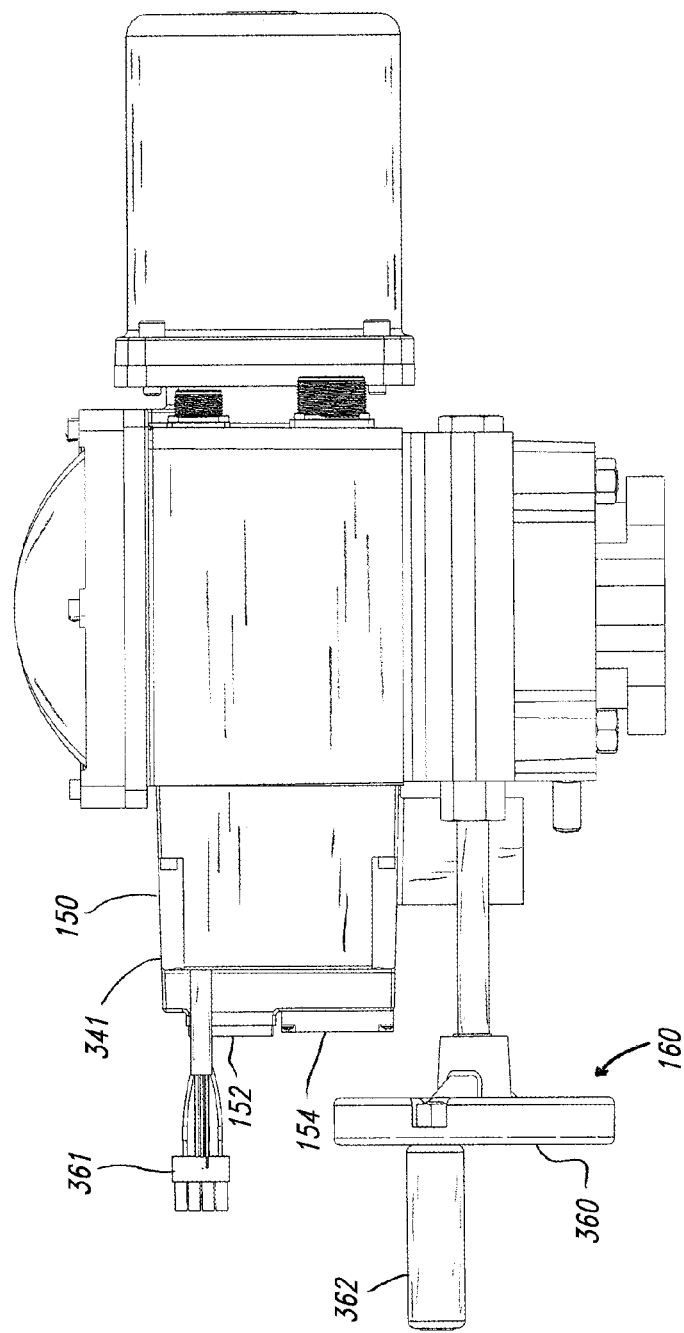
FIG. 6 is a side elevational view of a valve actuator assembly, in accordance with one embodiment.

As shown in FIGS. 1 and 6, the controller 150 includes a housing 341 and a connector 361 extending from the housing 341 for reading and receiving data via direct electrical connection. The display 152 and input device 154, illustrated as an input pad, are on the front of the controller 150. The input device 154 can include, without limitation, one or more buttons, keyboards, touch pads, control modules, and/or peripheral devices for user input. The illustrated input device 154 includes an upper row of buttons 350 and a lower row of indicator lights 352. A user can control the valve actuator assembly 120 using the buttons 350 and lights 352.

As used herein, the term "valve" is broadly construed to include, but is not limited to, a device capable of regulating a flow of one or more substances by opening, closing, or partially blocking one or more passageways. For example, a valve can halt or control the flow of a fluid (e.g., a liquid, a gas, or mixtures thereof) through a conduit, such as a pipe, tube, line, duct, or other structural component (e.g., a fitting) for conveying substances. Valve types include, without limitation, ball valves, butterfly valves, globe valves, plug valves, and the like.

Figure 2:
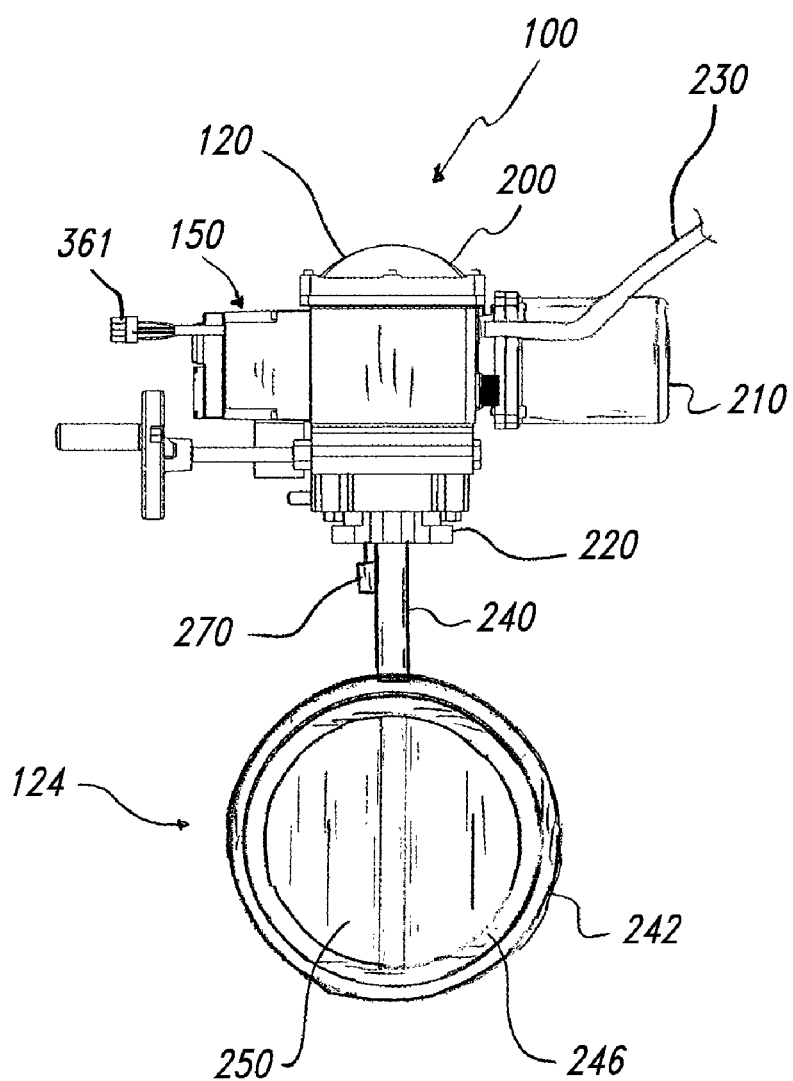
FIG. 2 is a side elevational view of a valve system when a valve of the valve system is in a closed position, in accordance with one embodiment.

Referring to FIG. 2, the valve actuator assembly 120 includes a main body 200, an electric motor 210 fixedly coupled to the main body 200, and a mounting assembly 220. The main body 200 houses and protects moving internal components that transmit the output of the motor 210 to the valve 124. The motor 210, when energized, causes movement of the valve 124. A power line 230 delivers power to the motor 210 and/or other electrical components.

Figure 3:
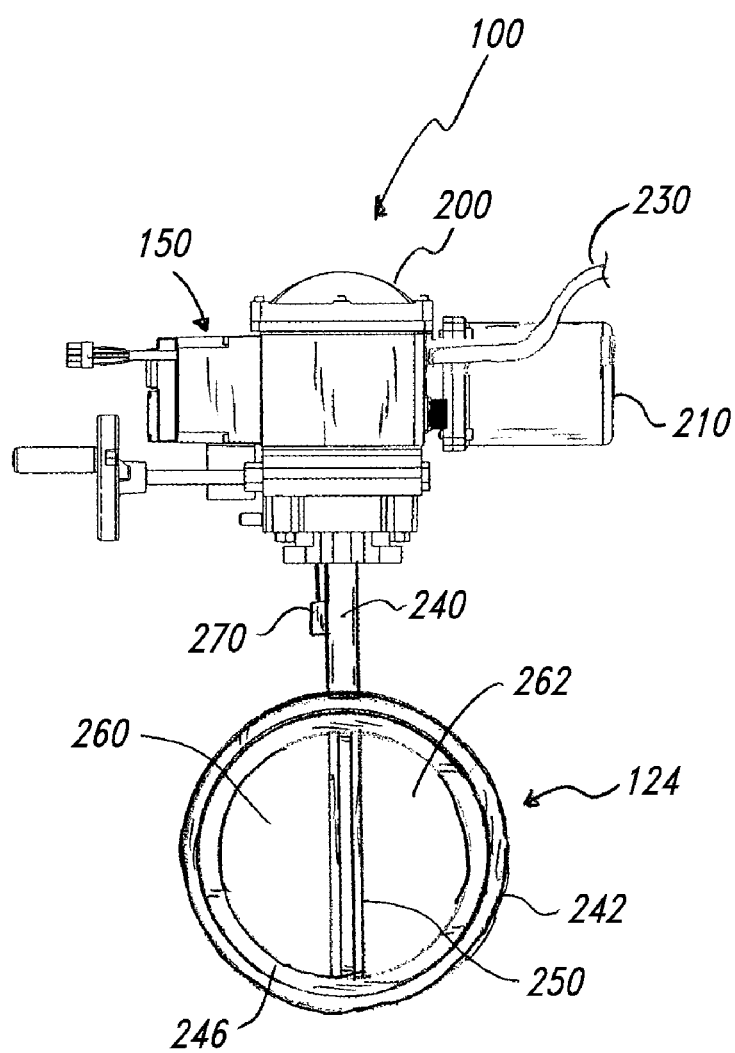
FIG. 3 is a side elevational view of the valve system of FIG. 2 when the valve is in a fully open position, in accordance with one embodiment.

The illustrated valve 124 is in the form of a butterfly valve and includes a connector 240 that extends between a valve housing 242 and the mounting assembly 220. The valve 124 includes the valve housing 242, a sealing member 246 carried by the housing 242 and a valve member 250, illustrated as a generally circular disk, moveable between a closed position (FIG. 2) and an open position (FIG. 3). When the valve member 250 is in the closed position, a seal, in most embodiments, a fluid tight seal, is formed by the valve member 250 and the sealing member 246. When the valve member 250 is in the open position, substances can flow through the openings 260, 262 shown in FIG. 3.

The valve system 100 further includes one or more sensors to evaluate operation of the valve 124. In some embodiments, including the illustrated embodiment of FIGS. 2 and 3, a sensor 270 is mounted or adjacent to the connector 240 and is communicatively coupled to the controller 150. In other embodiments, the sensor 270 can be incorporated into the main body 200, the mounting assembly 220, or any other suitable component or subassembly of the valve system 100.

Sensor 270 is capable of sensing various different operating features and forces present during operation of the valve. In one embodiment, the sensor 270 is an angular position sensor that detects and sends one or more signals indicative of the angular position of the valve member 250. In other embodiments, the sensor also detects the amount of force applied to the valve via connector 240 by the motor 210. The sensor 270 can detect the torque applied to the connector 240 to cease rotation of the valve and also detect the position of the valve while the torque is being applied. In some embodiments, various forces, such as lateral forces, axial forces, sealing forces, the force applied to the connector 240 at or by the motor 210, as well as the force the connector 240 applies to the valve 124 may be detected.

Figure 4:
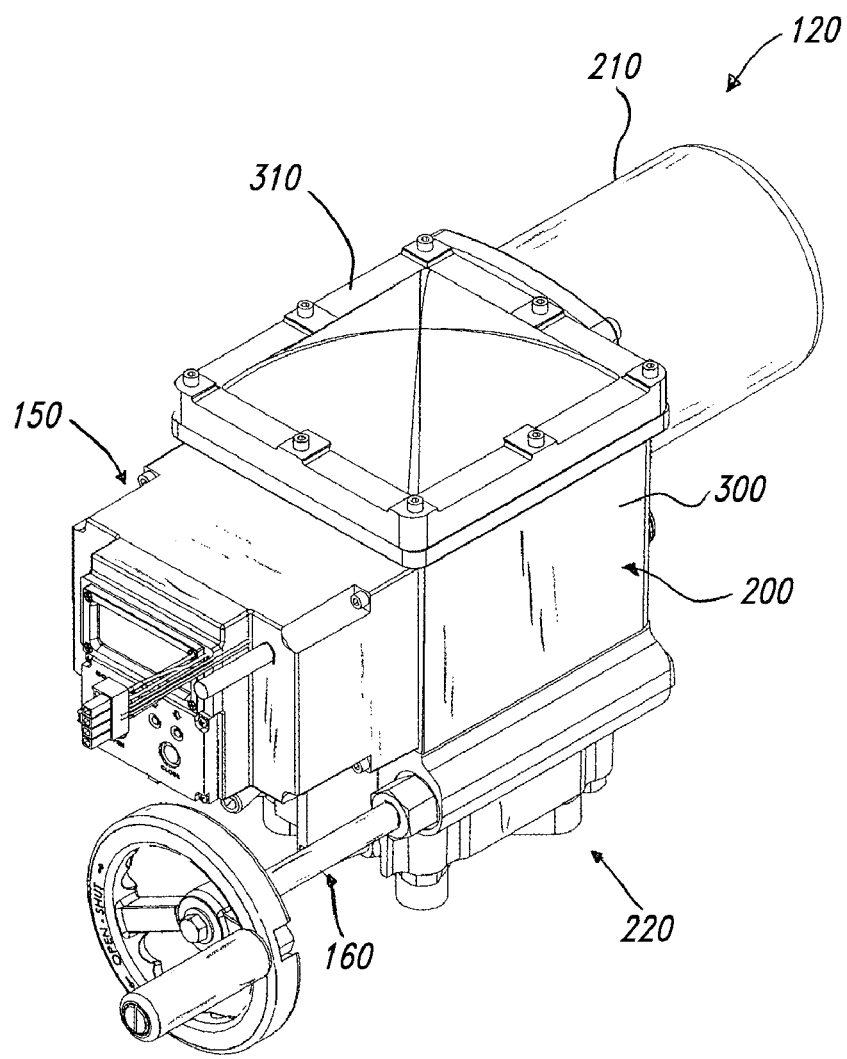
FIG. 4 is a front, top, left isometric view of a valve actuator assembly, in accordance with one embodiment.

FIG. 4 shows the major components of the valve actuator assembly 120, including the main body 200, the motor 210, the mounting assembly 220, and the hand wheel assembly 160. Each of these major components includes many elements and other components, as explained herein.

Both the controller 150 and the hand wheel assembly 160 extend outwardly away from the main body 200 for convenient user access. The main body 200 includes a housing 300 and a cover 310 removably coupled to the housing 300. The cover 310 can be separated from the housing 300 to access internal components within the housing 300, if needed or desired.

The motor 210 of FIG. 4 is configured to covert electrical energy to mechanical force or motion. For example, the motor 210 can include, without limitation, one or more DC motors (e.g., a brushless DC motor, brushed DC motor, and the like), AC motors, or other devices suitable for outputting the desired force or motion. In the embodiment of FIG. 4, motor 210 is an AC motor that includes a stationary stator and a rotor that moves with respect to the stator to generate a desired torque.

If the valve actuator assembly 120 is in the form of a pneumatic or hydraulic valve actuator, an electric motor need not be used and the appropriate power supply or other drive device may be used. For example, a pneumatic valve actuator assembly can be powered by a high pressure fluid line (not shown). A power line, such as the power line 230 of FIGS. 2 and 3, may supply power to the controller while highly-pressurized fluid from the fluid line drives mechanical components of the valve actuator assembly.

Figure 5:
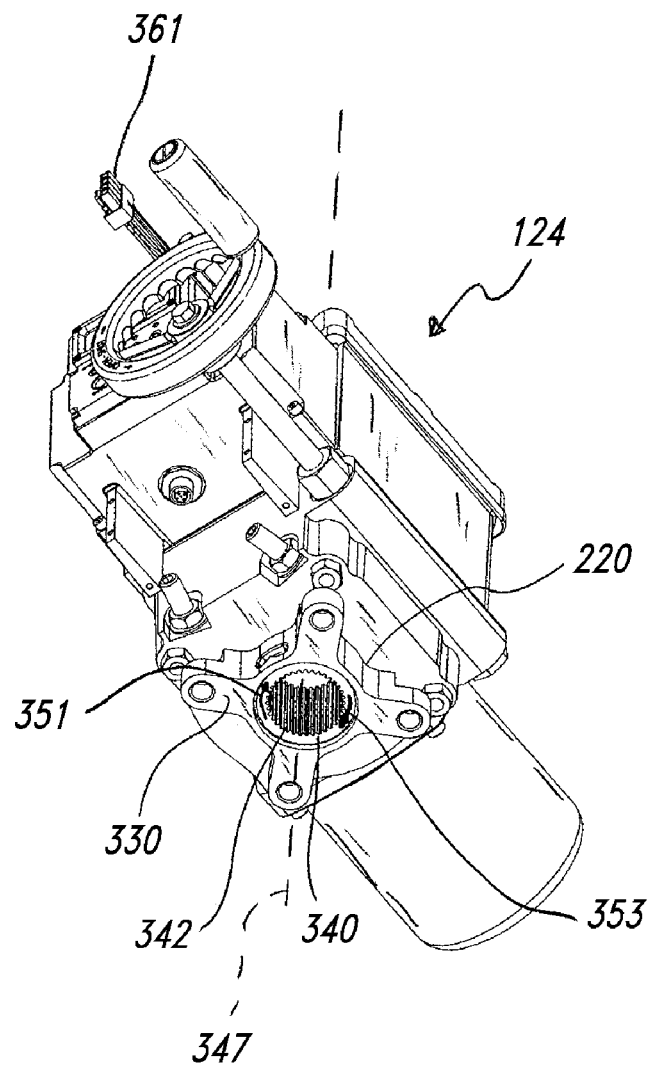
FIG. 5 is a front, bottom, left isometric view of a valve actuator assembly, in accordance with one embodiment.

Referring to FIG. 5, the mounting assembly 220 includes a bracket 330 for connecting to a support structure, such as a wall, post, or support structure 331 of the type shown in phantom in FIG. 1, and an output assembly 340. The output assembly 340 is adapted to couple to the connector 240 and to rotate about an axis of rotation 347, as indicated by the arrows 351, 353. As shown in FIG. 5, an inner periphery 342 of the cylindrical output assembly 340 has a series of teeth or other machined surface so that it is physically coupleable to an inner rotating shaft of the connector 240, such that the valve member 250 rotates under power from the output assembly 340. Additionally or alternatively, the output assembly 340 can include, without limitation, one or more bearings, output shafts, chucks, couplers, split rings, clamps, brackets, set screws, fasteners, pins, and the like for temporarily or permanently coupling to the valve 124.

Figure 7:
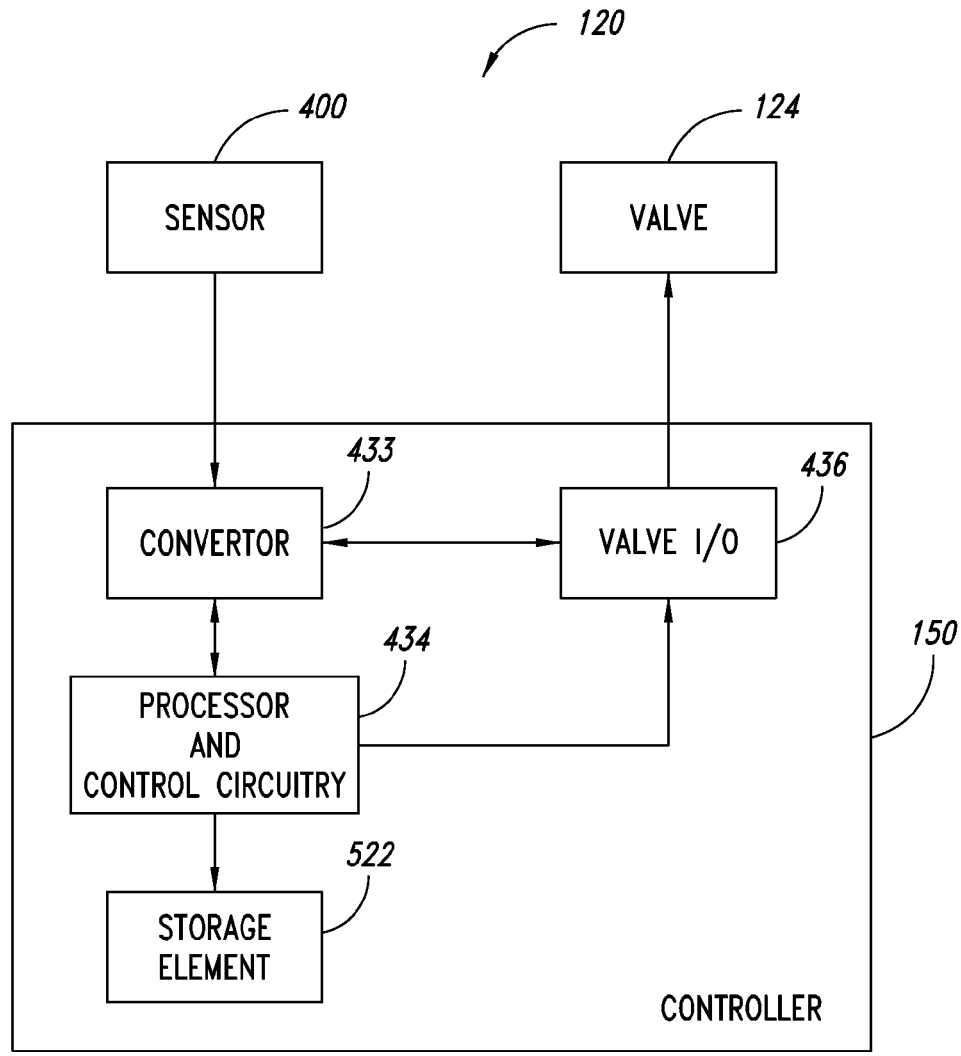
FIG. 7 is a block diagram of components of a valve actuator assembly, in accordance with one embodiment.
Figure 8:
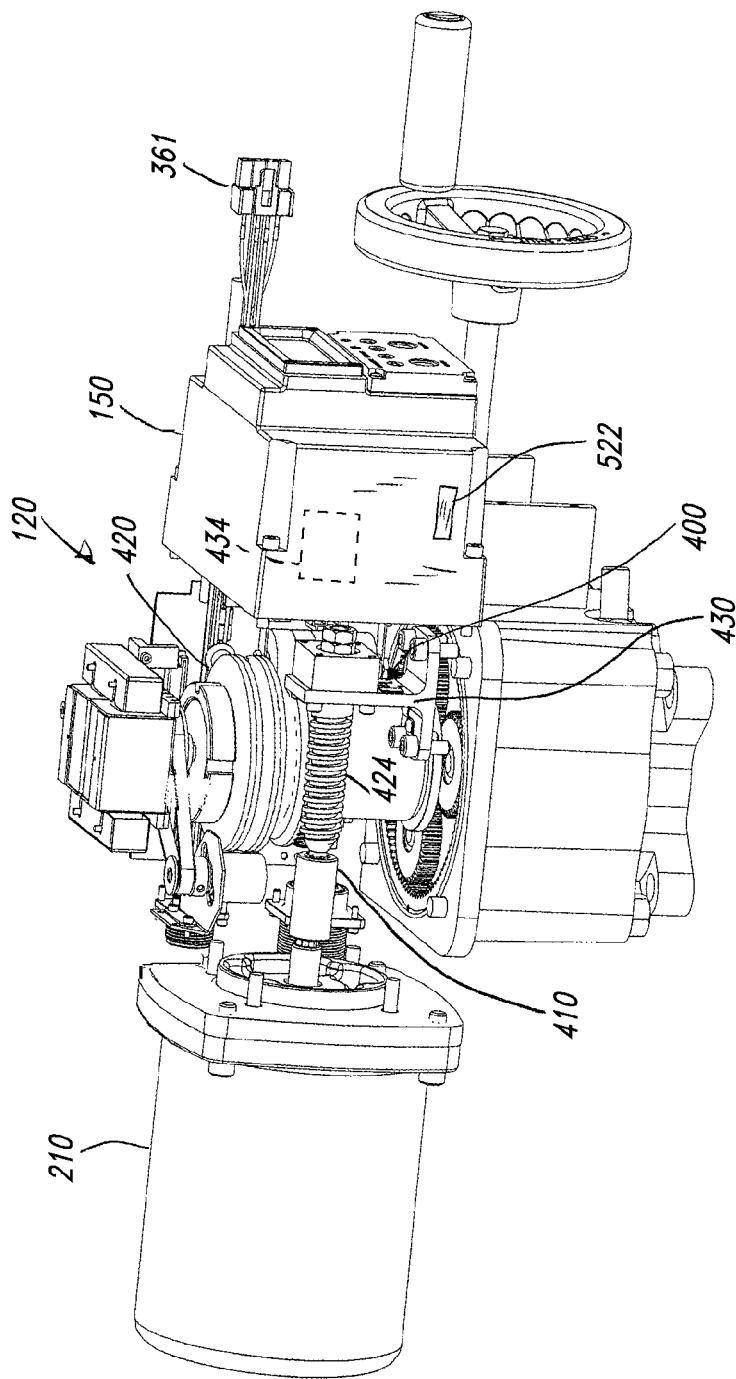
FIG. 8 is a pictorial view of a valve actuator assembly with a main housing shown removed, in accordance with one embodiment.

Referring to FIGS. 7 and 8, the valve actuator assembly 120 includes a sensor 400 that communicates directly or indirectly with the controller 150. The sensor 400 sends one or more signals to the controller 150. In some embodiments, the controller 150 operates the valve 124 based, at least in part, on those signals. The sensor 400 measures or otherwise senses the force applied to the valve 124 at any given time, state of the valve 124, for example, whether the valve 124 is opened or closed, the current position of the valve member 250, and the like.

The sensor 400 can be an electromechanical sensor that may include, without limitation, one or more strain gauges, circuitry (e.g., a Wheatstone bridge, resistors, potentiometers, and the like), limit switches, and the like. Alternatively or additionally, the sensor 400 can be in the form of one or more electric sensors, optical sensors, proximity sensors, or mechanical sensors, as well as other types of known sensors.

With continued reference to FIGS. 7 and 8, a worm gear assembly 410 is connected to a drive assembly 420, which interconnects the worm gear assembly 410 to the valve 124. The worm gear assembly 410 includes a worm gear 424 capable of rotating about its longitudinal axis in order to drive the drive assembly 420. A support bracket 430 supports the worm gear 424 and limits axial motion of the worm gear 424. When the worm gear assembly 410 applies a torque to the drive assembly 420, an axial load is generated and applied to the bracket 430 via the worm gear 424. This applied load causes deflection of the bracket 430. The sensor 400 is mounted on the bracket 430 and detects the strain of the bracket 430 and generates one or more signals indicative of that strain. The sensor 400 may also detect the number of rotations of the worm gear, the speed of rotation at each stage of operation, and other information about the movement of the valve 124.

The drive assembly 420 can include, without limitation, one or more gears, spur gears, gear systems, planetary gear systems, drive members, such as drive belts, drive chains, drive shafts, etc., clutch plates, transmission systems, carriers, and the like. Various types of drive assemblies, including known drive assemblies, can be employed. Such systems are well known in the art.

Referring again to FIG. 7, the sensor 400 sends signals to a converter 433 in the controller 150. The converter 433 can be an analog-to-digital converter that converts analog signals (e.g., continuous or discontinuous analog signals) to digital signals. The digital signals are then sent from the converter 433 to a processor and control circuitry 434 of the controller 150. For example, the converter 433 can convert analog voltage or other signals generated by the sensor 400 to digital data. The processor 434 sends signals to a valve I/O 436. The output from the valve I/O 436 is used to operate the valve 124. In this manner, the controller 150 can use a digital output to control operation of the valve 124. Other types of converters can also be employed, if needed or desired.

Various types of electronic devices, integrated circuitry, and the like can be incorporated into the system 100 to process signals from the sensor 400. In some embodiments, for example, the converter 433, as well as other types of signal processors, can be incorporated into the controller 150, as shown in FIGS. 7 and 8.

The processor uses information to learn the state of the system. This information is stored by the processor in a memory 522. The processor may also combine other system information with sensed data and store them together in the memory 522. The processor 434, for example, may store the data associated with sending a signal from itself to the valve I/O 436, then receiving a signal from the sensor 400 regarding the timing of when the valve 124 moved, which the processor 434 can compare to when the signal was sent.

Similarly, force data related to how much force or power was used by the motor 210 as well as the force sensed by the sensor 400 that was applied to the valve 124. The amount of time required to close and open the valves, the force required at each stage from fully open to fully closed, and from fully closed to fully open, and the various commands issued by the processor at each stage can be stored in the storage element 522. This various data can be used to provide calibration data as well.

Figure 9:
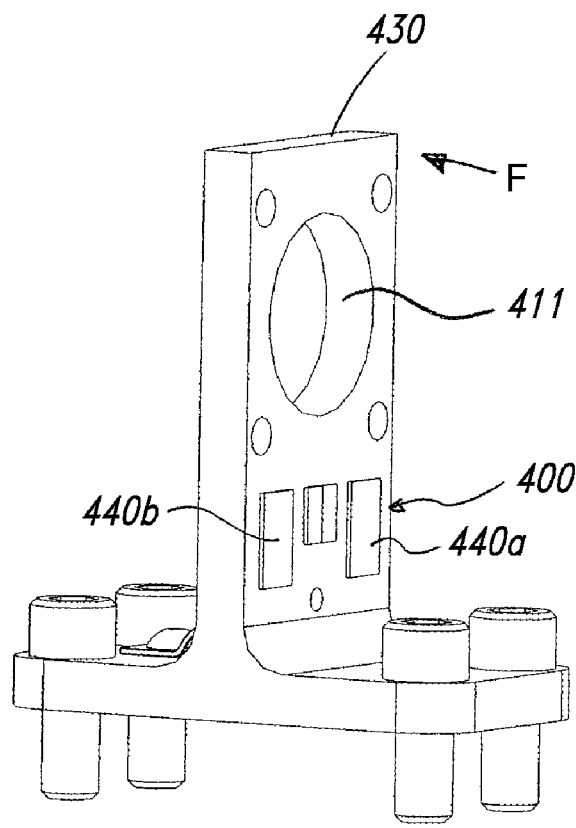
FIG. 9 is an isometric view of a sensing element of a sensor, in accordance with one embodiment.

FIG. 9 shows a plurality of sensors and strain gauges 440a, 440b (collectively 440) of the sensor 400. The sensor 400 has an aperture 411 through which the shafted worm gear passes. The sensor and strain gauges 440 are physically coupled to the cantilevered bracket 430. Deformation of the strain gauges 440 causes changes in their electrical resistance. This resistance change is used to determine the amount of force applied to the bracket 430. A current is applied to the strain gauges 440 such that the strain gauges 440 output signals related to the deformation of the bracket 340, which in turn is related to the force applied to the valve 124.

The positions, orientations, and configurations of the strain gauges 440 can be selected based on the loads that are applied to the bracket 430. As shown in FIG. 9, the strain gauges 440 are oriented vertically to measure strain of the bracket 430 when the bracket 430 is deformed by the load applied to the worm gear 410. The strain gauges 400 can be bonded to opposing outer surfaces of the bracket 430. Various types of bonding agents or adhesives can be used to permanently couple the gauges 400 to the bracket 430. Leads can connect the gauges 400 to circuitry of the controller 150. The gauges 440 may also sense speed of rotation and number of rotations for a shaft passing through aperture 411. Various optical, electrical, capacitive, magnetic, or other types of sensors can be used for this purpose.

The controller 150 can use feedback from the sensor 400 and the settings to determine appropriate commands for one or more components of the valve actuator assembly 120, such as the motor 210. The controller 150 can be programmed before, after, and/or during installation of the valve system 100, the valve actuator assembly 120, or the controller 150, as well as any other component or subassembly of the valve system 100. As used herein, the term "program" includes, without limitation, inputting information to enable a controller or other computing device to perform a set or sequence of instructions. As used herein, the term "input" may include, without limitation, one or more processes or methods of indirectly or directly providing information to a controller or other computing device. It is understood that the device that receives or transmits information may initiate the transfer of such information. For example, the controller 150 can initiate the transfer of information from a remote device to itself via direct memory access. In some embodiments, a user can manually input information, such as control data or calibration data, into the input device 154 to program the controller 150. The controller 150 may then utilize that information to perform a wide range of calculations. Calibration data may be force calibration data that correlates detected displacement or strain and the position of the valve member 250.

The controller 150 may be programmed upon initial installation or at any other time. If data stored by the controller 150 is corrupted or erased, the controller 150 can be reprogrammed. Data might be corrupted due to hardware failures, physical damage to controller circuitry, and the like. Damage to storage element 522 may also cause data corruption. By way of another example, if the valve 124 is replaced with another valve, the controller 150 can be reprogrammed to operate the new valve. Operation of different valves may involve using different sets of data. Conversely, if the controller 150 is replaced, and the same drive assembly and valve remain in place and are used, the replacement controller will need to be programmed to ensure proper valve operation. In this case, the settings from storage element 522 can be programmed into the replacement controller. The replacement controller can be programmed without opening its housing to ensure that unwanted contaminates (e.g., dirt or water) do not enter the housing.

Since the controller settings may vary greatly between different valves, even between the same types of valves, having the data stored for the valve is beneficial and time saving. If the valve actuator assembly 120 is replaced, the controller of the replacement valve actuator assembly can be programmed with information from the prior valve actuator assembly 120. In this manner, replacement valve actuator assemblies can be quickly and conveniently programmed in the field with minimal user interaction.

Figure 10:
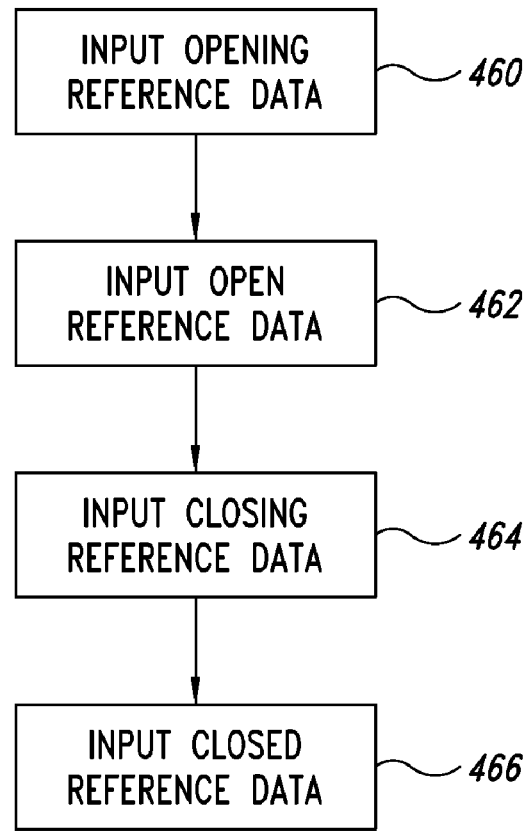
FIG. 10 is a flow diagram of an exemplary method of inputting data, in accordance with one embodiment.

FIG. 10 illustrates a method of setting up a controller for use with a valve. Generally, the method of FIG. 10 can be performed to input reference data to the valve actuator assembly 120 independently of a load. The controller 150 is adapted to store this reference data and to open and close the valve 124 based, at least in part, on the stored data and at least one signal from the sensor 400. If needed or desired, the controller 150 can be reprogrammed any number of times based on replacement or maintenance of components of the valve system 100. If the valve actuator assembly 120 fails to properly open and close the valve 124, the controller 150 can be reprogrammed such that the actuator assembly 120 properly opens and closes the valve 124. The reference data can be generated using various types of calibration techniques, such as the calibration technique discussed in connection with FIG. 12.

Reference data includes, without limitation, opening valve data, open valve data, closing valve data, closed valve data, calibration data, timing data, force data, and the like. This data corresponds to different positions of the valve member 250. Reference data may also include other types of data related to the angular position, rotational speed, and other operating conditions of the valve member 250. The reference data can be provided by the original equipment manufacturer or another suitable source and can be generated by applying a known force to the output assembly 340 and detecting the output from the sensor 400. The reference data can be inputted to the controller 150 using, for example, the sensor 400, the input device 154, a peripheral or other computing device communicatively coupled thereto, a portable storage element (e.g., a replaceable storage element), or combinations thereof. For example, the sensor 400 of FIG. 3 or a peripheral device 502 of FIG. 13 can input data directly into a memory of the controller 150. One example method of programming the controller 150 using a set of reference data is discussed below.

At 460, opening valve data can be inputted into the controller 150. The opening valve data corresponds to one or more signals from the sensor 400 when the valve member 250 is approximately midway between the closed and fully open positions and traveling towards the open position. In some embodiments, for example, the opening valve data is associated with an opening valve signal generated by the sensor 400 when the valve actuator assembly 120 provides an opening force. The sensor 400 detects this opening force and outputs an opening valve force signal corresponding to that force.

The opening force includes a range of forces during the opening sequence that moves the valve member 250 positioned generally midway to the fully open and fully closed positions. The opening force can thus be the force used to move the valve member 250 when the valve member 250 is approximately midway between the open position and the closed position. The opening force can be greater than the minimal force required to move the valve member 250 to increase the rotational speed of the valve member 250. As the valve 124 opens and the valve member 250 approaches its end of travel, the force required to move the valve member 250 at the fully open position as it tries to stop increases significantly. The valve member 250 can contact a stop when it reaches the fully open position and thus will remain stationary, even if a large force is applied. Similarly, the force to move the valve 124 from the open position to the closed position requires different amounts of force at different stages.

The opening valve data is generated and stored by the controller 150 by mechanically manipulating the valve in a test cycle and collecting reference data via the sensor 400. For example, the cover 310 can be separated from the housing 300 to access the sensor 400. A user applies a force F, illustrated in FIG. 9, to the bracket 340 such that the sensor 400 generates a target digital number corresponding to a torque applied to open the valve 124. The force F is increased or decreased to increase or decrease a digital number generated by the sensor 400. Once the target digital number is reached, a user uses the input device 154 (e.g., the buttons 350) to program that number directly into the memory of the controller 150. Thus, the user can rapidly and conveniently manipulate the sensor 400 to program the controller 150. This process can be repeated to store additional reference data.

At 462, the open valve data is inputted to the controller 150. Open valve data corresponds to one or more signals from the sensor 400 when the valve member 250 is proximate to or at the fully open position (e.g., at the end of travel). In some embodiments, the open valve data is associated with an open valve signal generated by the sensor 400 when the valve actuator assembly 120 moves the valve member 150 at least proximate to or at a fully open position. As noted above, the force needed to move the valve member 150 to the fully open position is greater than a nominal or midway opening force. The sensor 400 generates the open valve signal when the valve member 250 contacts a stop that limits further opening of the valve 124, thereby indicating that the valve 124 has reached the fully open position.

At 464, the closing valve data is inputted into the controller 150. Closing valve data corresponds to one or more signals from the sensor 400 when the valve member 250 is approximately midway between the closed and fully open positions and traveling towards the closed position. For example, the closing valve data is associated with a closing valve signal generated by the sensor 400 when the valve actuator assembly 120 provides a nominal closing force for closing the valve 124. The nominal closing force is considered the normal force used to move the valve member 250 towards the closed position when the valve member 250 is approximately midway between the open position and the closed position. As the valve 124 closes and the valve member 250 approaches its end of travel closed position, the force required to move the valve member 250 increases significantly. This closing force is therefore greater than the nominal closing force.

At 466, the closed valve data is inputted into the controller 150. Closed valve data corresponds to one or more signals from the sensor 400 when the valve member 250 is proximate to and also at the fully closed position. In some embodiments, the closed valve data is associated with a closed valve signal generated by the sensor 400 when the valve actuator assembly 120 moves the valve member 250 at least proximate to a closed position. As the member 250 bears against the sealing member 246, the force required to press the member 250 against the sealing member 246 to form a desired fluid tight seal will increase. The sensor 400 detects this force and outputs the closed valve signal corresponding to that force. Thus, the closed force will be greater than the nominal closing force. It is understood that the data can be inputted in any order. If desired, the closed valve data and closing valve data is programmed before the open valve data and the opening valve data.

Torque limits can also be inputted into the controller 150. For example, the sensor 400 and/or input device 154 can be used to input desired toque limits. Other types of limits (e.g., position limits) can also be provided to the controller 150.

The valve actuator assembly 120 is programmed with the reference data to properly open and close the valve 124 at desired speeds. If the valve actuator assembly 120 applies excessively large torques, the valve 124 may be damaged. For example, if the valve member 250 is closed using an excessively large force, the valve member 250 may strike and damage the seating member 246. If the valve member 250 is opened using an excessively large force, the valve member 250 may strike and damage the stop connected to the valve housing 242. Bearings and other components of the valve actuator assembly 120 and valve 124 may also become permanently damaged. Advantageously, the controller 250 can be programmed to minimize or substantially eliminate these types of problems. In addition, the force history to open and close a valve will provide an indication of whether the valve is becoming worn and if it has reached a stage that repair is needed.

Figure 11:
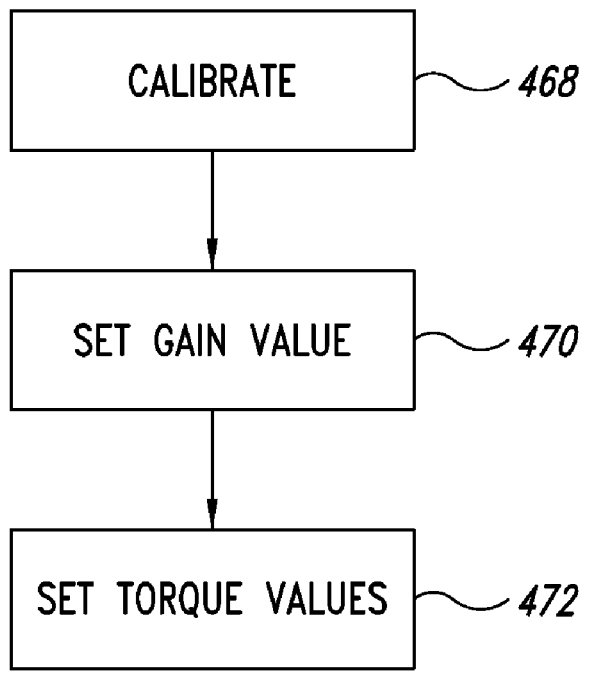
FIG. 11 is a flow diagram of an exemplary method of programming a valve actuator assembly, in accordance with one embodiment.

The sensor 400 may be calibrated. Calibration includes, without limitation, the process of zeroing the strain gauges of the sensor 400, setting sensor limits, and/or setting operating parameters such as gain values, as well as inputting relationships between sensor outputs and known forces applied to the output assembly 340. At 468 of FIG. 11, a user calibrates the sensor 400 by manually rotating the output assembly 340 to determine that the force worm gear 424 alone applies. It may be that the idle worm gear force is so low that it is not detectable by the sensor 400. After this bracket 340 is unloaded, the sensor 400 is calibrated, for example, it is set to zero when it is known that the force is zero. This ensures that changes in resistance of the strain gauges 400 correspond to the force applied to the valve 240. If needed or desired, the valve actuator assembly 120 may be separated from the valve 124 during some parts of this calibration procedure. Additionally, a gain or amplification value can be inputted into the controller 150 at 470. At 472, other reference data can be inputted. For example, torque values, expected time to close, and other data can be inputted to the controller 150. Other types of programming procedures can be performed based on the operation of the sensor 400.

The sensor 400 can be used to automatically calibrate the valve actuator assembly 120 using a calibration test stand 476 (shown in FIG. 13) and the peripheral device 502 in the form of an external controller (e.g., a computer or the like). Different types of valves may be opened and closed using different torques settings. The valve actuator assembly 120 can be programmed with reference data for properly operating any number of different valves. Reference data for the valve actuator assembly 120 can be generated such that the valve actuator assembly 120 can be mounted on different valves without replacing or modifying internal components of the assembly 120. Additionally, the calibration procedure can be performed without having an operator apply any loads for a convenient and rapid calibration process. Different types of wired or wireless connections can be used to provide communication between the external device 502, calibration test stand 476, valve actuator assembly 120, as well as any other devices.

The illustrated valve actuator assembly 120 is mounted on the calibration test stand 476. The external device 502 controls operation of the valve actuator assembly 120. The external computer 502, for example, moves the output assembly of the valve actuator assembly 120 to different positions corresponding to states of operation of the valve to which the valve actuator assembly 120 will be installed. The sensor 400 measures loads applied by the calibration test stand 476 during separation of the assembly 120 to determine reference data, such as torque settings (e.g., the opening and closing torque limits for the particular valve to be mated to the valve actuator assembly 120).

Figure 12:
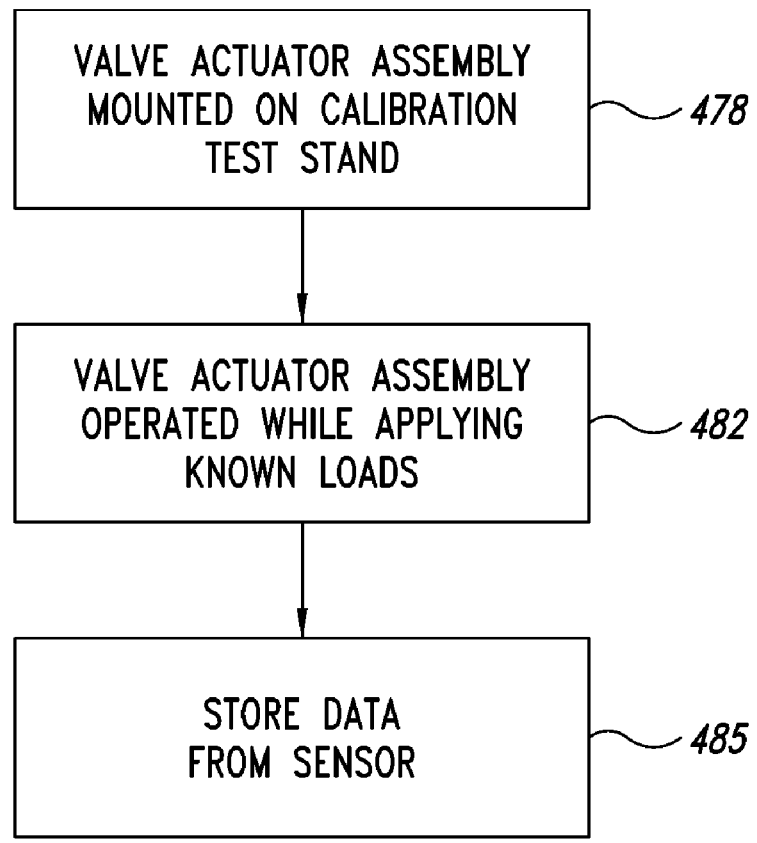
FIG. 12 is a flow diagram of an exemplary method of calibrating a valve actuator assembly, in accordance with one embodiment.

FIG. 12 is illustrates a method of automatically calibrating the valve actuator assembly 120. At 478, the valve actuator assembly 120 is mounted on an output 479 (FIG. 13) of the calibration test stand 476. The calibration test stand 476 is capable of applying loads to the output assembly of the valve actuator assembly 120 via the output 479. A wide range of different types of calibration test stands 476 can be used to apply desired predetermined loads. If the valve actuator assembly 120 is calibrated in the field, the calibration test stand 476 can be a portable system. If the valve actuator assembly 120 is calibrated by the original equipment manufacture, the calibration test stand 476 can be a stationary calibration test stand.

Figure 13:
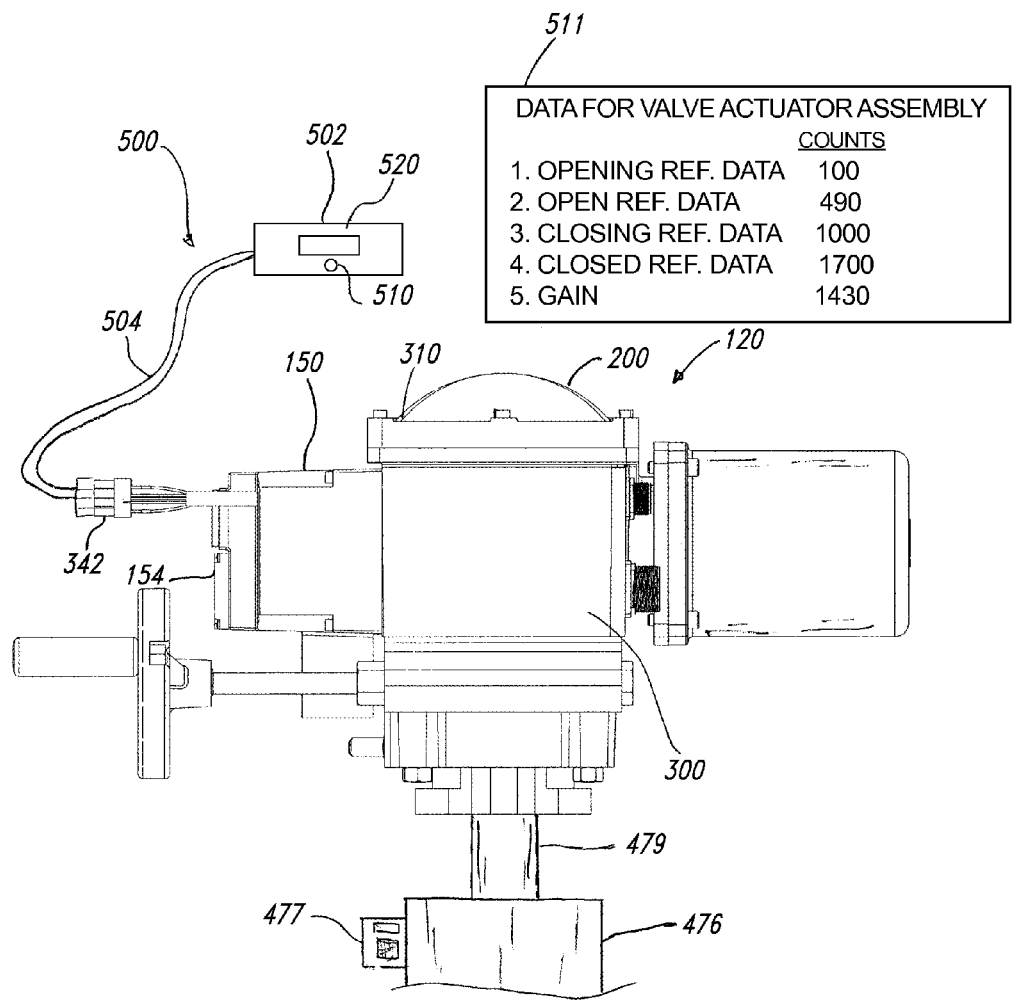
FIG. 13 is a pictorial view of a data sheet and a valve actuator assembly coupled to an electronic input system, in accordance with one embodiment.

The calibration test stand 476, in some embodiments, applies loads that are generally equal to the loads that the valve actuator assembly 120 will apply when installed. The calibration test stand 476 can thus be selected based on the end use of the valve actuator assembly 120. The illustrated output 479 of FIG. 13 is a rotatable shaft fixedly coupled to the output assembly 340 shown in FIG. 5. To apply a load to the valve actuator assembly 120, the shaft 479 is rotated. The external device 502 controls a motor that drives the output 479 computer 352 is communicatively coupled to a controller 477 of the calibration test stand 476.

At 482, the valve actuator assembly 120 is operated while the calibration test stand 476 applies load(s) to the output assembly 340 to generate data, such as torque settings, profiles, or other reference data.

The device 502 commands both the valve actuator assembly 120 and the calibration test stand 476 using a stored calibration program. Based on the output from the sensor 400 and the loads applied by the calibration test stand 476, the device 502 generates reference data, including torque curves, torque settings, open and close positions, opening/closing speeds, and the like. The device 502 can compare the output from the sensor 400 and the calibration test stand 476 to perform a wide range of different types of calibrations.

In some embodiments, the external device 502 commands the valve actuator assembly 120 to move to a starting position, such as an open position. The device 502 commands the valve actuator assembly 120 to move to a closed position and also commands the calibration test stand 476 to apply a known load. The measurements from the sensor 400 are recorded. The sensor 400 can measure the applied loads during closing, at the fully closed position, and the like.

The valve actuator assembly 120 is then moved to the open position. The device 502 commands the valve actuator assembly 120 to move to an open position and also commands the calibration test stand 476 to apply a known load. The sensor 400 measures the applied load during opening, at the fully open position, and the like.

At 485, data from the valve actuator assembly 120 is stored in the controller 150, device 352, or other suitable store device, such as a database for quality assurance and maintenance purposes by the manufacturer or end user. The data can be stored as part of the calibration settings for the valve actuator assembly. For example, torque settings for the open and closing torque limits for the particular valve to be used with the valve actuator assembly 120 are loaded from a database and saved to the controller 150. The valve actuator assembly 120 can use those torque settings to operate the valve. Sets of data can be stored in the controller 150 such that the valve actuator assembly 120 is properly calibrated for different types of valves, even valves with significantly different operating parameters. If the controller 150 is replaced with another controller, the torque settings for the open and closing torque limits can be inputted into the replacement controller using techniques disclosed herein.

The method of FIG. 12 can be performed any number of times to generate reference data for different types of valves. A plurality of sets of reference data can be generated. Each set of reference data can correspond to a different valve. A user can select a set of reference data based on the specifications of the valve and program the valve actuator assembly using that set of data. If the valve actuator assembly is installed on another valve, another set of reference data can be used to reprogram the valve actuator assembly. Additionally, the sequence or order of the steps of the automated calibration process of FIG. 12 can be changed, if needed or desired.

In operation, various types of calculations are performed by the controller 150 using stored information, signals from the sensor 400, and the like. For example, the programmed controller 150 can compare the output from the sensor 400 to stored reference data. Based on the comparison, the controller 150 can control movement of the valve 124. In some embodiments, the controller 150 can generate a relationship, such as a force-displacement relationship, a sensor signal-valve member position relationship, and the like, using the reference data. Based on the displacement measured by the sensor 400, the controller 150 controls the operation of the valve 124. The display 152 can display a force (e.g., 1000 ft·lb$_f$) determined using the measured displacement. Thus, the controller 150 can accurately operate the valve 124 while providing feedback to a user suitable for evaluating performance of the valve system 100.

Advantageously, the valve actuator assembly 120 can be programmed in the field. In the prior art, if the valve actuator assembly 120 is installed along the conduit 110 of a watercraft, it may be difficult or impossible to apply a calibrated load to the actuator assembly 120. Equipment capable of applying calibration forces to the output assembly 340 may be unsuitable for transport on watercraft. With the inventive circuit, structure, and method described herein, the valve actuator assembly can now be calibrated or loaded with data after it is installed on the watercraft. The method of FIGS. 10 and 11 can be used to calibrate the valve actuator assembly 120 in the field without disassembling the valve system 100 (e.g., separating the valve actuator assembly 120 and the valve 124) and/or without employing traditional prior art calibration equipment.

Other types of techniques can be used to input information data to the controller 150. FIG. 13 shows an electronic simulator 500 for inputting information to the controller 150. The simulator 500 includes the peripheral device 502, illustrated as a potentiometer, or other circuit connected to the controller 150 via a communication line 504. A data sheet 511 can include the information to be programmed in the controller 150. Each valve actuator assembly can include a unique data sheet based on the characteristics of its components, such as the sensitivity of the sensor 400. The illustrated data sheet 511 includes counts and for different operating states.

The electronic simulator 500 may also have a memory that has stored therein the specific information for this valve, this can be downloaded to the controller 150 or used to perform calibration of the valve assembly 124. When using the electronic simulator 500, the sensor 400 can be disconnected from the controller 150 such that the controller 150 only displays the signal from the device 502. The user can operate an input 510 of the device 502 so that a display 520 displays the desired output (e.g., 100 counts). At this point, the device 502 sends a signal indicative of 100 counts to the controller 150. The user can then use the input device 154 to store the signal into memory. This procedure can be performed any number of times to set any number of counts in the controller 150. The sensor 400 can be re-calibrated (e.g., zeroed) after programming the desired counts. Advantageously, the controller 150 can be programmed without dissembling the main body 200 to prevent contamination of the internal components. Thus, the electronic simulator 500 is well suited for use in moist environments, such as marine environments.

Other types of electronic simulators can also be employed. Exemplary force simulators include, without limitation, signal generators or other devices suitable for outputting signals (e.g., analog signals or digital signals, or both) similar to signals that might be generated by the sensor 400 during operation of the valve 124. In some embodiments, the cover 310 can be removed from the housing 300 to connect electronic simulators to internal circuitry. The cover 310 can be re-coupled to the housing 300 after programming the controller 150.

In some embodiments, a kit can be used to replace key parts of the controller 150. The kit can include a replacement controller, the electronic simulator 500, and the data sheet 511. The controller 150 can be removed from the main body 200 and replaced with the replacement controller. The electronic simulator 500 and the data sheet 511 may be used to perform a set-up routine to program the replacement controller with the new parts.

Figure 14:
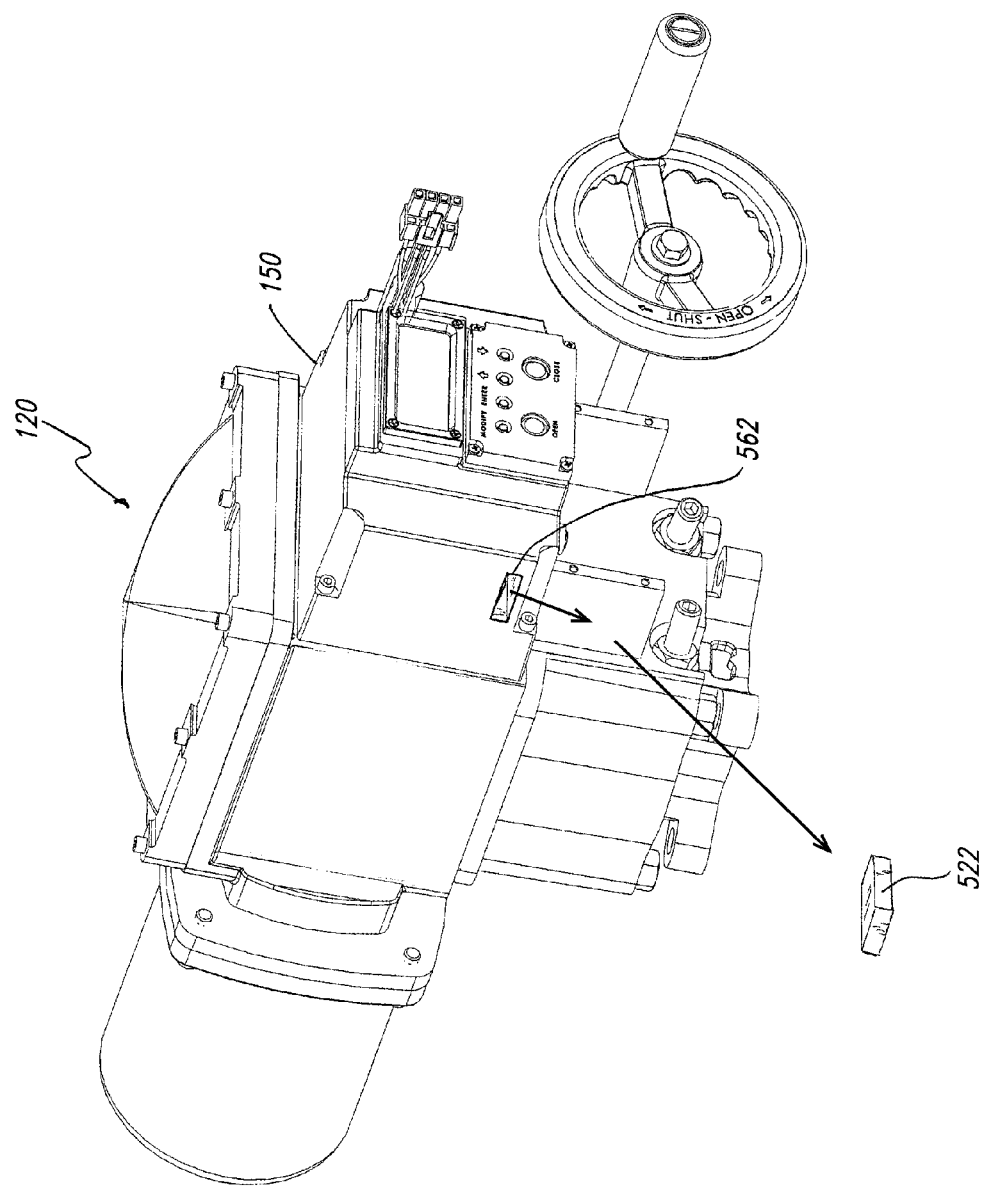
FIG. 14 is a pictorial view of a valve actuator assembly with a removable storage element removed from a controller, in accordance with one embodiment.

FIG. 14 shows a removable storage element 522 serving as memory for storing information usable by the controller 150. The storage element 522 is configured to accept and store information in the form of, for example, computer readable data (e.g., executable code). Examples of storage elements include, without limitation, non-volatile memory devices (e.g., flash memory devices, universal serial bus flash drives ("USB flash drives"), and the like), memory cards (e.g., flash memory cards), floppy disks, hard drives, magnetic tapes, magneto-optical disks, electrically erasable programmable read-only memory ("EEPROM"), optical disks, other optical storage devices, random access memory ("RAM"), read only memory ("ROM"), combinations thereof, or the like. Optical disks may include, without limitation, CDs (e.g., compact disk read-only-memory ("CD ROM"), recordable disks ("CD-R"), and the like), DVDs, and the like.

The storage element 522 can be removed from a slot 562 in the controller 150 and inserted into and communicatively coupled to another controller. The slot 562 can be, without limitation, a bay (e.g., a drive bay), port (e.g., a USB port, serial port, etc.), and the like. If the controller 150 is replaced, the storage element 522 can then be easily inserted into the replacement controller. The replacement controller will then use the information stored on the storage element 522 to operate components of the valve system 100. If the entire valve actuator assembly 120 is replaced with another valve actuator assembly, the storage element 522 can be temporarily installed in the replacement valve actuator assembly, the data downloaded and either kept in place or removed.

A wide range of information can be stored on the storage element 522. The storage element 522 can store, without limitation, reference data, valve performance data, data for determining forces generated by the valve actuator assembly 120, performance history, limit values (e.g., limit values corresponding to maximum and/or minimum applied forces and/or positions), torque-displacement curves, relationships, calibration data, and the like. The reference data can include counts corresponding to output from the sensor 400. As shown in FIG. 13, the set of reference data includes counts of 100, 490, 1000, and 1700. Each of these counts can correspond to different torques. These counts can be determined using a calibration procedure. Valve performance data is used to determine whether components of the valve 124 should be repaired or replaced. For example, if the sealing member 246 becomes excessively compliant, the sealing member 246 can be replaced with a new sealing member. The data for determining forces generated by the valve actuator assembly 120 is used to determine torque versus displacement curves and sensor signals versus valve positions. Torque versus displacement curves are used to determine appropriate forces to open and close the valve 124. Sensor signals versus valve position information can be used to evaluate accuracy of the sensor 400. If the sensor 400 outputs signals outside of a preset limit, a user can be notified to check the sensor 400. Performance history of the valve 124 is used to determine when to perform maintenance or when to replace various valve components. Various types of problems can be avoided by utilizing the performance history to determine and perform preventative procedures. This information can be used to determine when to perform maintenance, replace components of a valve system, or the like.

If needed or desired, the storage element 522 of FIG. 14 can be removed from the controller 150 to load stored information into another electronic device, such as a personal computer. The personal computer can then analyze the information. The memory 522 in one embodiment is the menu memory of the system. In an alternative embodiment, a separate memory is provided for the controller 150 and memory 522 has two parts, one part that is permanent in the controller 150 and one part that is removable.

Figure 15:
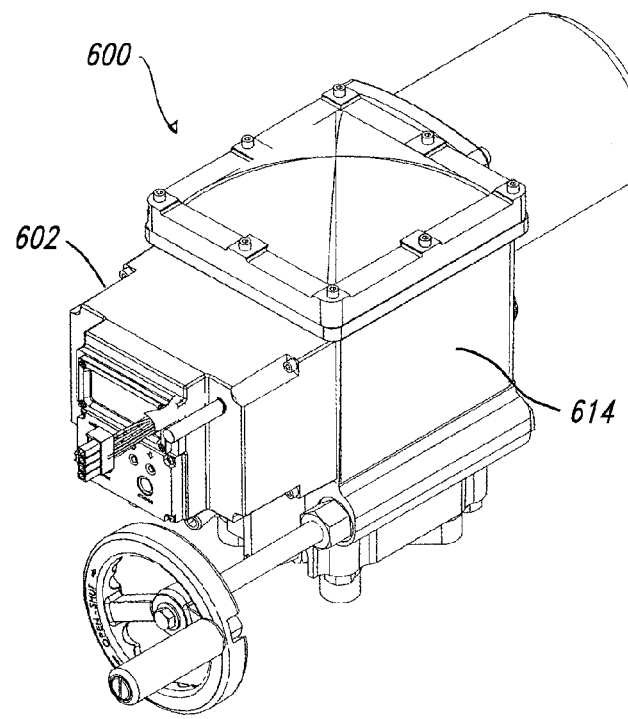
FIG. 15 is an isometric view of a valve actuator assembly with a removable controller, in accordance with one embodiment.
Figure 16:
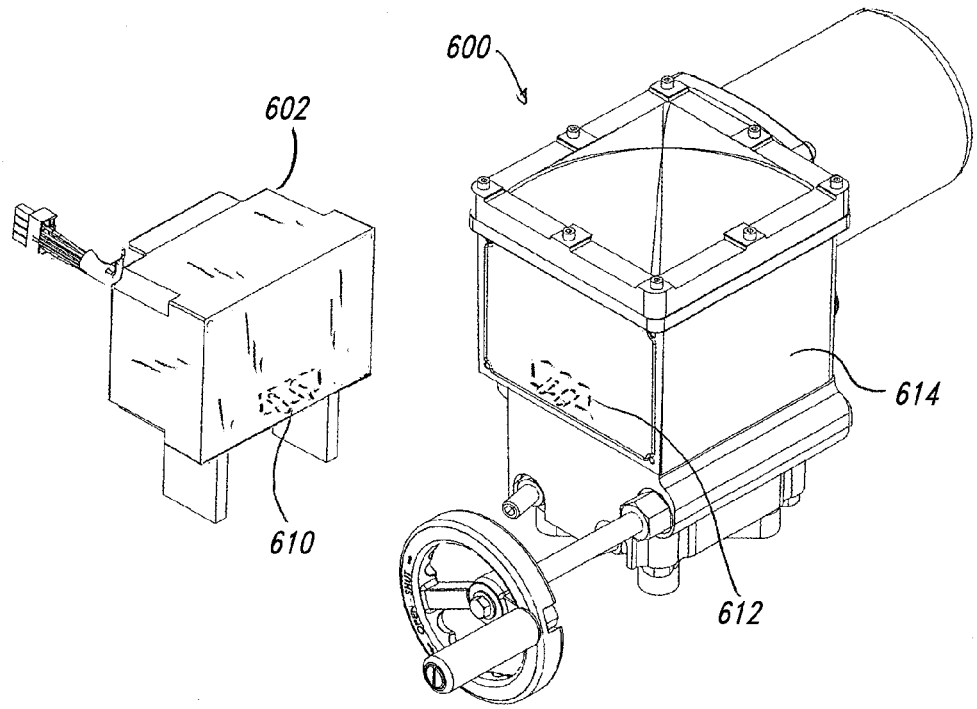
FIG. 16 is an isometric view of the valve actuator assembly of FIG. 14, wherein the controller is separated from a main body.

As noted above, the valve actuator assemblies described herein allows for field replaceable controllers. FIGS. 15 and 16 illustrate a valve actuator assembly 600 that includes a removable controller 602 having an interface 610 for mating with a corresponding interface 612 of a main body 614. The interfaces 610, 612 can include, without limitation, one or more plugs, ports, connectors, communication devices, and the like operable to communicate information between the controller 602 and the main body 614. The positions, configurations, and sizes of the interfaces 610, 612 can be selected based on the type and number of sensors, or other feedback devices, in the main body 614. The removable controller 602 is like the controller 150, but it can be easily removed and replaced. Thus, the entire controller can be replaced if needed. The memory 522 from the old controller can be placed in the new controller 602.

Figure 17:
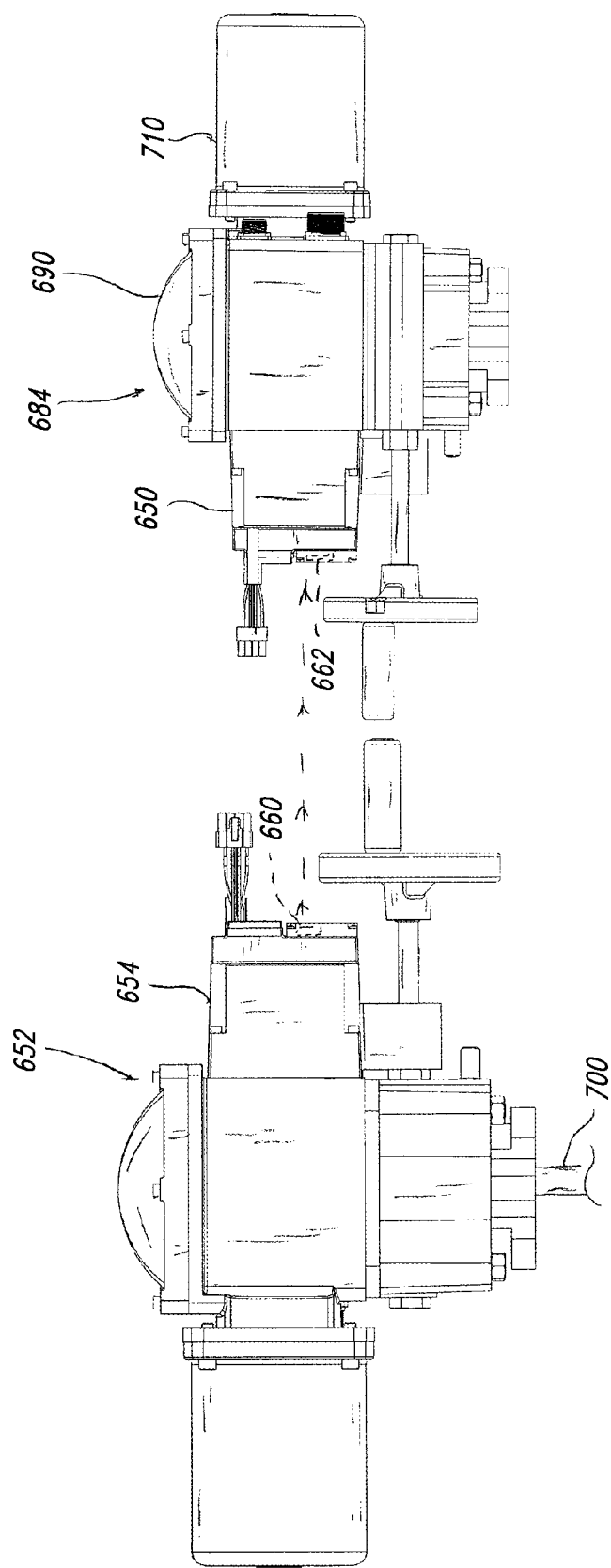
FIG. 17 is a side elevational view of two valve actuator assemblies wirelessly communicating with each other, in accordance with one embodiment.

Referring to FIG. 17, controllers can exchange information. One controller 650 can receive information wirelessly transmitted by a mounted and installed valve actuator assembly 652. The illustrated valve actuator assembly 652 includes a controller 654 that has a wireless communication device 660 (shown in phantom) that communicates with a wireless communication device 662 (shown in phantom) of the controller 650. The wireless communication devices 660, 662 can include, without limitation, one or more infrared communicators, antennas, wireless transponders, transmitters, receivers, optical communicators, and/or transceivers configured to wirelessly transmit and/or receive information.

In FIG. 17, the communication device 660 is sending information to the communication device 662. The transmitted information can then be stored in the controller 650. The term "store" is broadly construed to include, without limitation, any mechanism for temporarily or permanently holding information in a storage element, memory, or other suitable device for storing information.

Figure 18:
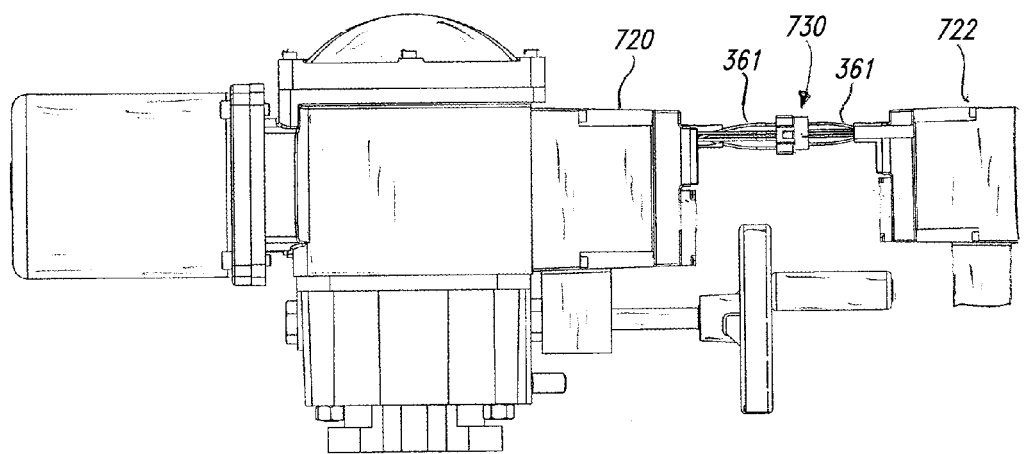
FIG. 18 is a side elevational view of a controller of a valve actuator assembly connected to another controller via a wired connection, in accordance with one embodiment.

Various types of wired connections can be established between valve actuator assemblies or components thereof to transfer information. FIG. 18 shows a controller 720 connected to a controller 722 via a wired connection 730. The illustrated wired connection 730 is formed by a first connector 361 of the controller 720 physically coupled to a connector 361 of the controller 722. Various types of cables, adaptors, plugs, and the like can be used to facilitate communication between the illustrated controllers 720, 722. Different types of wired or wireless network connections can also be used to provide communication between valve actuator assemblies or components thereof. Alternatively, the main body 670 valve actuator assembly 652 can be replaced and the controller 654 of the prior valve assembly coupled to the new main body and no programming is needed. The controller 654 can then be calibrated to the new valve body.

Unless the context requires otherwise, throughout the specification and claims which follow, the word "comprise" and variations thereof, such as "comprises" and "comprising," are to be construed in an open, inclusive sense, that is as "including, but not limited to."

It should be noted that, as used in this specification and the appended claims, the singular forms "a," "an," and "the" include plural referents unless the context clearly dictates otherwise. For example, the term "a sensor" includes a single sensor and/or a plurality of sensors. It should also be noted that the term "or" is generally employed in its sense including "and/or" unless the context clearly dictates otherwise.

Various methods and techniques described above provide a number of ways to carry out the invention. There is interchangeability of various features from different embodiments disclosed herein. Similarly, the various features and acts discussed above, as well as other known equivalents for each such feature or act, can be mixed and matched by one of ordinary skill in this art to perform methods in accordance with principles described herein. Additionally, the methods which are described and illustrated herein, such as methods of installation, programming, calibration, and the like, are not limited to the exact sequence of acts described, nor are they necessarily limited to the practice of all of the acts set forth. Other sequences of events or acts, or less than all of the events, or simultaneous occurrence of the events, may be utilized in practicing the embodiments of the invention.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A marine valve actuator assembly configurable to operate a plurality of different valves, the valve actuator assembly comprising:
    a main body, the main body including a movable output assembly, the movable output assembly alternatively coupleable to a valve and an output of a calibration test stand;
    a motor adapted to cause movement of the output assembly of the main body relative to the main body to open and close the valve when the output assembly is coupled to the valve for operation thereof and to apply a rotational force to the output of the calibration test stand during a calibration operation in which the output assembly is coupled to the output of the calibration test stand;
    a hand wheel assembly coupled to the main body, the hand wheel assembly adapted to cause movement of the output assembly relative to the main body to open and close the valve;
    a sensor coupled to the output assembly and operable to detect a force in response to a test load applied to the output assembly by the output of the calibration test stand during the calibration operation, or in response to a load applied during operation of the valve, and to generate a signal indicative of the force;
    a storage element adapted to store information indicative of the signal generated by the sensor to assist in calibrating the marine valve actuator assembly for subsequent operation of the marine valve actuator assembly with the output assembly coupled to the valve; and
    a controller communicatively coupled to the motor and the storage element and operable to control the motor based at least in part on the stored information stored by the storage element which includes information indicative of the signal generated by the sensor during the calibration operation.

2. The valve actuator assembly of claim 1, further comprising:
    a receiving slot configured to receive and releasably hold the storage element.

3. The valve actuator assembly of claim 1, wherein the storage element comprises at least one of a disk drive, a compact disk, and a flash memory device.

4. The valve actuator assembly of claim 1, further comprising:
    a first communication device configured to send the information stored by the storage element to a second communication device of another marine valve actuator assembly to enable replacement of the marine valve actuator assembly by the other marine valve actuator and reuse of the information stored by the storage element to operate the valve with the other marine valve actuator assembly.

5. The valve actuator assembly of claim 4, wherein the first communication device is adapted to wirelessly transmit the information.

6. The valve actuator assembly of claim 1, wherein the storage element comprises a computer readable medium and the controller is communicatively coupleable to another controller.

7. The valve actuator assembly of claim 1, wherein the sensor is an electromechanical sensor comprising at least one strain gauge.

8. A system comprising the marine valve actuator assembly of claim 1, and further comprising:
    the calibration test stand; and
    a peripheral device in communication with the calibration test stand and in communication with the marine valve actuator assembly, the peripheral device configured to command the calibration test stand and movement of the output assembly of the marine valve actuator assembly.

9. The system of claim 8, wherein the calibration test stand is configured to apply a force to the marine valve actuator assembly based on a signal from the peripheral device, and the sensor coupled to the output assembly marine valve actuator assembly is configured to detects the force applied by the calibration test stand.

10. The system of claim 9, wherein the peripheral device is adapted to compare the force detected by the sensor and a force signal from the calibration test stand.

* * * * *

UNITED STATES PATENT AND TRADEMARK OFFICE
CERTIFICATE OF CORRECTION

PATENT NO. : 8,342,478 B1  
APPLICATION NO. : 12/485809  
DATED : January 1, 2013  
INVENTOR(S) : Richard L. Cordray et al.

It is certified that error appears in the above-identified patent and that said Letters Patent is hereby corrected as shown below:

In the Claims

Claim 9, Column 20, Lines 52-53:
"the sensor coupled to the output assembly marine valve actuator assembly is configured to detects the force applied by the" should read, --the sensor coupled to the output assembly marine valve actuator assembly is configured to detect the force applied by the--.

Signed and Sealed this  
Third Day of September, 2013

Teresa Stanek Rea  
*Acting Director of the United States Patent and Trademark Office*